United States Patent Office

3,564,585
Patented Feb. 16, 1971

3,564,585
METHOD FOR MAKING STAINLESS STEEL CLAD ALUMINUM
William C. Camp, McMurray, Pa., assignor to Composite Metal Products, Inc., a corporation of Pennsylvania
No Drawing. Filed Aug. 19, 1968, Ser. No. 753,750
Int. Cl. B23p 3/02; C22f 1/04
U.S. Cl. 148—11.5          16 Claims

ABSTRACT OF THE DISCLOSURE

Aluminum is clad with stainless steel by mechanically cleaning the aluminum, heating the metal surfaces, in a heating zone, to a temperature above the recrystallization temperature of the aluminum, bringing the cleaned surface in contact with the stainless steel surface under a pressure to effect a two-step reduction of 5% to 35% in each of the metals. A 0.25% to 2.0% reduction is accomplished in the first stage, outside the heating zone, while the metals are above the recrystallization temperature with the remainder in the second stage. A diffusion bond is formed and the bonded metals are annealed at 700° F. to 900° F.

BACKGROUND OF THE INVENTION

This invention relates to stainless steel clad aluminum and to a method of making stainless steel clad aluminum by accomplishing the reduction and bonding in two stages.

The manufacture of clad metals is not new. There have been many processes developed for the cladding of a variety of metals with other dissimilar metals. The problems of cladding aluminum with stainless steel had, until recently, remained unsolved due in large measure to the dissimilarities between aluminum and stainless steel and particularly to the considerable differences in hardening qualities and oxidation rates.

In the recently issued Patent No. 3,261,724, a method of cladding aluminum and aluminum alloys with stainless steel is taught. This method comprises the steps of providing an outer layer of substantially pure aluminum on said aluminum or aluminum alloy; removing by mechanical treatment substantially all oxide from the surfaces of the outer layer of aluminum and stainless steel to be bonded; heating the metal surfaces to a temperature above the recrystallization temperature of aluminum but below the melting point of aluminum and below the recrystallization temperature of the stainless steel; bringing the cleaned surfaces into contact with one another under pressure sufficient to effect a simultaneous reduction up to 35% in each of the metals; urging them together to unite the surfaces into a diffusion bond and, thereafter, annealing at a temperature of about 700° F. to 900° F.

An improved method of carrying out this process has now been discovered. In this novel and improved method, the reduction of the two metals is carried out in two stages instead of one, as taught in the above-mentioned patent. In addition, it is no longer necessary, in this new method, to mechanically clean the surface of the stainless steel to be bonded. The two-stage reduction produces a stronger bond than the single stage reduction. Furthermore, the bonds produced in the new two-step reduction are almost entirely free of gas or air blisters or pockets whereas the bonds produced in the older one-step process often have gas pockets which tend to weaken the bond and destroy the integrity of the metal. When these bonded metals are subjected to further working, such as deep-drawing in the fabrication of cooking utensils, the integrity of the inter-metallic bond becomes very important. In bonded or clad metals with weakened bonds, deep-drawing or other working may rupture the bond and destroy the integrity of the finished piece. For these reasons, the novel methods of this invention are economically advantageous in that the integrally-clad product is less subject to failure.

SUMMARY OF THE INVENTION

This invention relates to a method of cladding aluminum or aluminum alloys with stainless steel. The method includes the steps of (a) providing an outer layer of substantially pure aluminum, on the aluminum or aluminum alloy; (b) removing, by mechanical treatment, substantially all oxide from the surfaces of the outer layer of aluminum to be bonded to the stainless steel surface; (c) heating the metal surfaces, in a heating zone, to a temperature above the recrystallization temperature of aluminum but below the melting point of aluminum and below the recrystallization point of stainless steel; (d) bringing the cleaned aluminum surface and the surface of the stainless steel into contact with one another, in a first stage, outside the heating zone, while at a metal temperature above the recrystallization temperature of aluminum, under a pressure sufficient to unite the surfaces into a diffusion bond and sufficient to effect a thickness reduction of 0.25 to 2.0 percent; (e) subjecting the thusly reduced metals, in a second stage, to a further reduction in thickness of 4.75 to 34.75 percent, the over-all reduction obtained in the two stages being from 5 to 35 percent; and (f) annealing the resulting bonded metals at a temperature from about 700° F. to about 900° F.

A preferable reduction in the second stage is from 9.75% to 34.75%. More preferable is a reduction in the first stage of 0.35% to 1.5% and a reduction in the second stage of 9.65% to 34.65%. Most preferred is a reduction of about 0.5% in the first stage and 9.5% to 34.5% in the second stage.

The mechanical treatment of the aluminum surface is preferably accomplished by wire brushing, abraiding or abrasive belt grinding.

The stainless steel may also be prepared by mechanically removing the oxide from its surfaces.

The second reduction stage of step (e) may also, preferably be carried out while the metals are at a temperature above the recrystallization temperature of aluminum.

The improved metod is also operative where the heating step (c) is carried out under non-oxidizing conditions in the heating zone. These nonoxidizing conditions may involve the use of an inert atmosphere, a reducing atmosphere or a vacuum.

Preferably, the outer layer should be at least 99% aluminum.

A preferable annealing period is from 2 to 15 minutes.

DETAILED DESCRIPTION OF THE INVENTION

This invention relates to an improved method of cladding aluminum and aluminum alloys and stainless steel. This invention is an improvement over the method of cladding aluminum and aluminum alloys which has been described in U.S. Pat. No. 3,261,724.

In the original method, as taught in the above-cited patent, an outer layer of substantially pure aluminum is provided on the aluminum or the aluminum alloy; oxide is removed from the surface of the outer layer of aluminum and the outer layer of stainless steel by mechanical means; the metal surfaces of the aluminum and stainless steel are heated, in a furnace or heating zone, to a temperature above the recrystallization temperature of aluminum, but below the melting point of aluminum and below the recrystallization temperature of stainless steel; the metal surfaces are brought into contact with one another under a pressure sufficient to effect a simultaneous reduction of up to 35% in each of the metals; the metals are urged together to unite the surfaces into a diffusion bond;

and the bonded metals are annealed at a temperature of from about 700° F. to 900° F.

It has now been discovered that a great improvement in the resultant bond is obtained if the simultaneous reduction of the metals and the urging of the metals together to form a diffusion bond is performed in two stages after the metals are removed from the furnace or heating zone. The first reduction stage is performed at a temperature above the recrystallization temperature of the aluminum but below the melting point of the aluminum and also below the recrystallization temperature of stainless steel. The second reduction stage need not be performed while the metals are at a temperature within this range. Preferably, however, the second reduction stage is also performed at a temperature within this range.

In the first stage, a simultaneous reduction of 0.25% to 2.0% is accomplished and, in the second stage, a simultaneous reduction of 4.75% to 34.75% is accomplished. Preferable reductions in the first stage are 0.35% to 1.5% coupled with a reduction in the second stage of 9.65% to 34.65%. The total overall reduction is from 5 to 35% and the preferable overall reduction is from 10 to 35%. Most preferred is a reduction in the first stage of about 0.5% and a reduction in the second stage of 9.5% to 34.5%.

The two-stage reduction processes of this invention have also made possible a further improvement over the older methods. With the new two-stage reduction processes, it is no longer necessary to mechanically clean the stainless steel surfaces before bonding the aluminum to the stainless steel. This elimination of a step in the bonding process renders the new process of this invention economically advantageous.

In the practice of the methods of U.S. Pat. No. 3,261,724, it was found useful to press the metals together before, during and after heating in order to express any gases trapped between the metal sheets and to promote more intimate contact prior to the simultaneous reduction of the metals. In practicing the methods of the above-cited patent, pinch rolls located within the furnace or heating zone often served to bring the metals together and to propel them into a rolling mill for the simultaneous reduction of the dissimilar metals. While the pinch rolls did serve to bring the metals together and possibly reduced the thickness of the metals 0.1 percent, the results were often erratic and a frequent result was the formation of blisters between the dissimilar metals and heavy creases in the surface of the bonded dissimilar metals. These blisters and creases would result in weak bond areas or unbonded areas even after a heavier reduction pass in the large rolling mill located out of the heating zone. These weak bond areas would result in defective shells when the bonded metals were deep drawn.

In the improved method of the present invention, a rolling mill, capable of precise adjustment, is located outside the furnace or heating zone. This rolling mill is used to accomplish the initial step of the simultaneous reduction of the two metals. No pinch rolls are used in the furnace or heating zone in the new process. The metal stack, after heating and while the surfaces are still above the recrystallization temperature of aluminum, is passed into this rolling mill for initial reduction. The stack is then passed to a larger rolling mill where the second step of the simultaneous reduction takes place. Other devices, aside from rolling mills, may of course be used to accomplish the two-stage reductions of this invention.

The resultant bonded metals have typical strengths of 150 to 200 pounds per inch of width as contrasted to typical strengths of 40 to 60 pounds per inch of width found in bonded metals which were produced by using pinch rolls and a single-step size reduction process, as taught in the cited patent.

The improved method of this invention would not be obvious from a contemplation of the original method and the marked product improvement is quite surprising. It would appear that the use of pinch rolls, within the furnace while the metals are quite hot, to compress the metals and initiate the diffusion bond would result in a superior bond. This did not prove to be the case as it was very difficult, in the original method, to bring the metals into intimate contact without forming blisters between the metals or creases in the surface of the bonded metals. It was found that a rolling mill, located outside the heating zone and capable of precise, very light reductions, was vastly superior to pinch rolls in eliminating blisters or air pockets between the metals and creases in the surface of the bonded metals. The use of the rolling mill also seemed to allow the formation of a more intimate and complete initial diffusion bond between the metals than was formed using the pinch rolls. It was further found that placing such a mill, or a similar device, contiguous to the exit end of the furnace rather than within the furnace itself made it possible to consistently effect intimate contact (i.e. no blisters or creases) between the metals by precisely controlling the very light reductions in the first reduction stage. This intimate contact between the dissimilar metals effected by the precise, light first-stage reduction prior to the heavy reduction results in a vastly superior product.

Removing the operation of bringing the metal surfaces into initial intimate contact from the heating zone greatly simplifies the problem of attaining this intimate contact. The roll temperature seems to be a critical factor and the control of the roll temperature within the desired range is greatly simplified if the temperature is 80° F. (as it is outside the heating zone) rather than 900° F. (a typical heating zone temperature). Water cooling of the rolls is, consequently, much more effective when the rolls are located outside the heating zone. Failure to control roll temperature contributes to blisters, creases and uneven reductions across the width of the bonded metals which in turn results in weak and erratic bonds incapable of withstanding the severe stress encountered in deep drawing.

The improved methods of this invention are applicable to the full range of products and processes taught in U.S. Pat. No. 3,261,724. Thus, bonded metals consisting of two original sheets, three original sheets and four or more sheets may be produced. Similarly, continuous coils of bonded metals may be produced from multiple coils of the single metals, as taught in the above-cited patent. The adjacent sheets need not be welded together but should be properly aligned with each other prior to diffusion bonding.

Although the above-cited patent requires the mechanical cleaning of the stainless steel, this cleaning has not been found to be necessary although it may be included as part of the improved processes of this invention.

The following examples are given solely for the purposes of illustration and are not to be construed as limiting this invention, many variations of which are possible without departing from the spirit or scope thereof.

EXAMPLE I

A piece or sheet of aluminum clad aluminum (1145 aluminum clad on each side of 3003 aluminum alloy) .090" x 18" x 54" was mechanically cleaned on both sides to remove all oxides and expose the pure crystalline or lattice structure. A sheet of austenitic stainless steel .015" x 18" x 55" was placed on either side of the mechanically cleaned aluminum core. The two sheets of stainless steel were tack welded together on the leading edge to properly align them. The stack was then heated in a furnace to at least the recrystallization temperature of aluminum (650°–1100° F.). The stack was automatically transferred from the furnace into a small rolling mill contiguous to the furnace exit and reduced in thickness 0.5 percent. It was then transferred into a larger mill and reduced approximately 9.5 percent.

The formed composite was then annealed for about seven minutes at 700° F. to 900° F. The resulting annealed composite was readily deep drawn into the desired shape. The bond strength on each side was in excess of 160 pounds per inch of width.

EXAMPLE II

The procedure of Example I was repeated except that the reduction was accomplished in a single stage outside the furnace. A pair of pinch rolls was used, in the furnace, to slightly compress the metal stack before it left the furnace and express the gases from between the metal sheets.

The resultant composite manifested an average strength of only forty pounds per inch and showed a heavy crease in the center rear section of the bonded sheet.

What is claimed is:

1. A method of cladding a sheet of aluminum with a stainless steel sheet, which comprises the steps of:
   (a) providing a layer of substantially pure aluminum to be bonded to the stainless steel sheet;
   (b) removing, by mechanical treatment, substantially all oxide from the surface of the layer of aluminum to be bonded to the stainless steel surface;
   (c) heating the metal surfaces, in a heating zone, to a temperature above the recrystallization temperature of said aluminum layer but below the melting point of said aluminum layer and below the recrystallization of the stainless steel sheet;
   (d) bringing the cleaned aluminum surface and a surface of the stainless steel sheet into contact with one another, in a first stage, outside the heating zone, while at a metal temperature above said recrystallization temperature of the aluminum layer, under a pressure sufficient to unite the surfaces into a diffusion bond and sufficient to effect a thickness reduction of the resultant composite sheet amounting to 0.25 to 2.0 percent;
   (e) subjecting the thusly reduced composite sheet, in a second stage, to a further reduction in thickness of 4.75 to 34.75 percent, the overall reduction obtained in the two stages being from 5 to 35 percent; and
   (f) annealing the resulting bonded metals at a temperature from about 700° F. to about 900° F.

2. The method of claim 1 wherein the second reduction stage of step (e) is carried out at a metal temperature above said recrystallization temperature of aluminum.

3. The method of claim 1 wherein the thickness reduction of step (d), in the first stage, is from 0.25% to 2.0% and the thickness reduction, in the second stage, of step (e) is from 9.75% to 34.75%.

4. The method of claim 1 wherein the thickness reduction of step (d), in the first stage, is from 0.35% to 1.5% and the thickness reduction, in the second stage, of step (e) is from 9.65% to 34.65%.

5. The method of claim 1 wherein the thickness reduction of step (d), in the first stage, is about 0.5% and the thickness reduction, in the second stage, of step (e) is from about 9.5% to 34.5%.

6. The method of claim 1 wherein substantially all the oxide is removed from the stainless steel by mechanical treatment in step (b).

7. The method of claim 1, wherein step (c) is carried out under nonoxidizing conditions.

8. The method of claim 7, wherein step (c) is carried out in an inert atmosphere.

9. The method of claim 7 wherein the heating step (c) is carried out in a vacuum.

10. The method of claim 7 wherein the heating step (c) is carried out in a reducing atmosphere.

11. The method of claim 1 wherein the aluminum layer provided in step (a) is at least 99% pure aluminum.

12. The method of claim 1 wherein the annealing step (f) is carried out for a period from 2 to 15 minutes.

13. The method of claim 1 wherein the mechanical treatment of step (b) is abrading of the surface of the aluminum.

14. The method of claim 1 wherein the mechanical treatment of step (b) is wire brushing of the aluminum surface.

15. The method of claim 1 wherein the mechanical treatment of step (b) is abrasive belt grinding of the aluminum surface.

16. The method of claim 1 wherein the layer of substantially pure aluminum is an outer layer of substantially pure aluminum provided on a sheet of aluminum alloy.

References Cited

UNITED STATES PATENTS

| | | | |
|---|---|---|---|
| 3,210,840 | 10/1965 | Ulam | 29—196.2 |
| 3,261,724 | 7/1966 | Ulam | 29—196.2 |
| 3,352,005 | 11/1967 | Avellone | 29—196.2 |

L. DEWAYNE RUTLEDGE, Primary Examiner

W. W. STALLARD, Assistant Examiner

U.S. Cl. X.R.

29—196.2; 148—11.5A

PO-1050
(5/69)

UNITED STATES PATENT OFFICE
CERTIFICATE OF CORRECTION

Patent No. 3,564,585          Dated February 16, 1971

Inventor(s) WILLIAM C. CAMP

It is certified that error appears in the above-identified patent and that said Letters Patent are hereby corrected as shown below:

Column 2, line 44, "metod" should be
                            --- method ---

Column 5, line 28, "point" should be inserted
                            before --- of the ---

Signed and sealed this 6th day of July 1971.

(SEAL)
Attest:

EDWARD M. FLETCHER, JR.                  WILLIAM E. SCHUYLE
Attesting Officer                            Commissioner of Pa